H. H. FULLER.
LITTER CARRIER CABLE SUPPORT.
APPLICATION FILED OCT. 29, 1918.
1,290,964.
Patented Jan. 14, 1919.
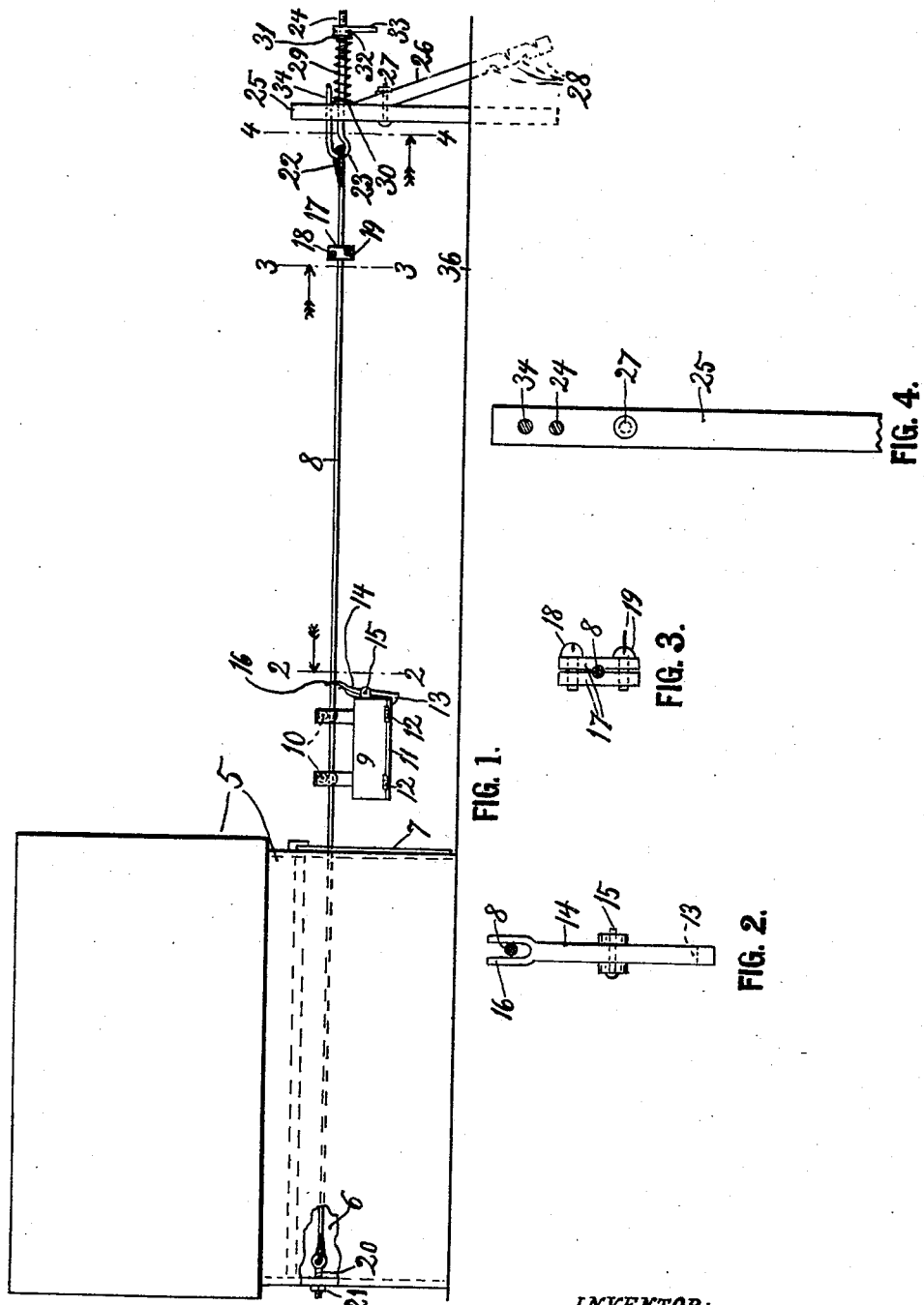

UNITED STATES PATENT OFFICE.

HARRY H. FULLER, OF RIVER FALLS, WISCONSIN.

LITTER-CARRIER-CABLE SUPPORT.

1,290,964.   Specification of Letters Patent.   Patented Jan. 14, 1919.

Application filed October 29, 1918.   Serial No. 260,218.

*To all whom it may concern:*

Be it known that I, HARRY H. FULLER, a citizen of the United States, residing at River Falls, in the county of St. Croix and State of Wisconsin, have invented a new and useful Litter-Carrier-Cable Support, of which the following is a specification.

My invention relates to improvements in litter carriers, and the main objects are, to provide a litter carrier with a track cable having improved supporting means which will not allow the cable to become slack, and which may readily take up any slack caused by special circumstances.

These and other objects I attain by the novel construction and combination of parts illustrated in the accompanying drawing, in which:

Figure 1 is a side elevation of a barn having a stable with a litter carrier embodying my improvements. Fig. 2 is an enlarged sectional view on the line 2—2 in Fig. 1. Fig. 3 is an enlarged sectional view on the line 3—3 in Fig. 1. Fig. 4 is an enlarged sectional view on the line 4—4 in Fig. 1.

Referring to the drawings by reference numerals, 5 designates a barn the lower story of which constitutes a stable 6 having one or more doors 7, which close the usual door opening of the stable.

Through said door opening extends the usual track cable 8, which is sufficiently inclined toward the stable to cause a litter carrying bucket, 9, to be returned to the stable by its own weight. Said bucket is provided with grooved pulleys 10 rolling on the cable 8; it also has a bottom 11 hinged at 12 and held closed by a hook 13 of a trip lever 14, which is pivoted at 15 and has its upper end 16 forked and straddling the cable 8, as best shown in Fig. 2. 17 is a clamp composed of two members clamped upon the cable by a screw 18 and a thumb screw 19, so it will stay at any desired part of the cable.

One end of the cable is secured to the rear stable wall by an eye bolt 20 having a nut 21, or by other suitable means in such a place that the bucket may be moved to a convenient place for filling it. The other end of the cable is provided with an eye 22, which is engaged by a hook 23 of a partly threaded rod 24, which rod extends through an aperture in a post 25, which is fixed in the ground the desired distance away from the stable and is held firm by a bracing post 26, bolted to it at 27 and at its lower portion provided with notches 28 to make it stick in the ground.

Upon the rod 24 is a coil spring 29 partly compressed between a washer 30 at the post and a washer 31 near a nut 32, the latter having a handle 33 by which to turn it. The hook 23 has its point 34 extended for some distance parallel to the rod 24, so as to guide in an aperture in the post and thereby prevent rotation of the rod 24 when the nut 32 is being turned.

In the operation of the device the bucket 9 is filled at the stable and given a push so it will run with the fork 16 against the obstructive clamp 17, whereby the lever 14 will tilt and disengage the hinged bottom 11 and allow the bucket to drop its contents upon such place or part of the ground 36 as may be predetermined by the placing of the clamp 17 on the cable. When the bucket has thus been emptied it is returned by its own weight to the stable, where it may be filled again and the operation repeated.

The spring 29, after being normally regulated by the nut 31, holds the cable properly stretched, and whenever the repeated strain and use of the cable, or the effect of the varied condition and temperature of the atmosphere causes any slackness in the cable, such slack may readily be taken up by a few turns of the nut 31. As said nut is turned but occasionally and is exposed to the weather, it is apt to stick on the screw rod 24 and would rotate it, hence the guiding arm 24 is of special necessity, besides the general necessity to prevent rotation of the rod even under normal circumstances.

What I claim is:

1. In a litter carrier, a single cable serving as a track and being stretched from the barn out over a field or yard, a post secured in the ground, a horizontal rod slidable in the post in line with the cable and having one end attached to the outer end of the cable, the other end being screwthreaded and provided with a nut, and a compression coil spring encircling the rod between the nut and the post.

2. The structure specified in claim 1, said slidable rod having at one end a hook engaging the end of the cable, said hook having its free end extended through an aperture in the post in parallel relation to the rod so as to prevent rotation of the latter.

In testimony whereof I affix my signature.

HARRY H. FULLER.

Copies of this patent may be obtained for five cents each, by addressing the "Commissioner of Patents, Washington, D. C."